Figure 5:
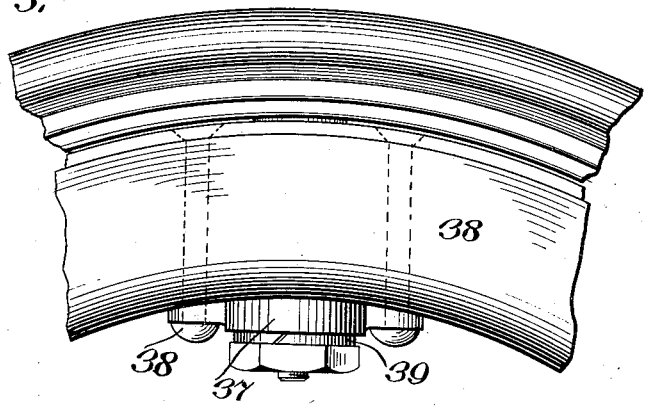

J. H. WAGENHORST.
VEHICLE WHEEL RIM.
APPLICATION FILED JAN. 22, 1912.
1,177,459.
Patented Mar. 28, 1916.
2 SHEETS—SHEET 1.
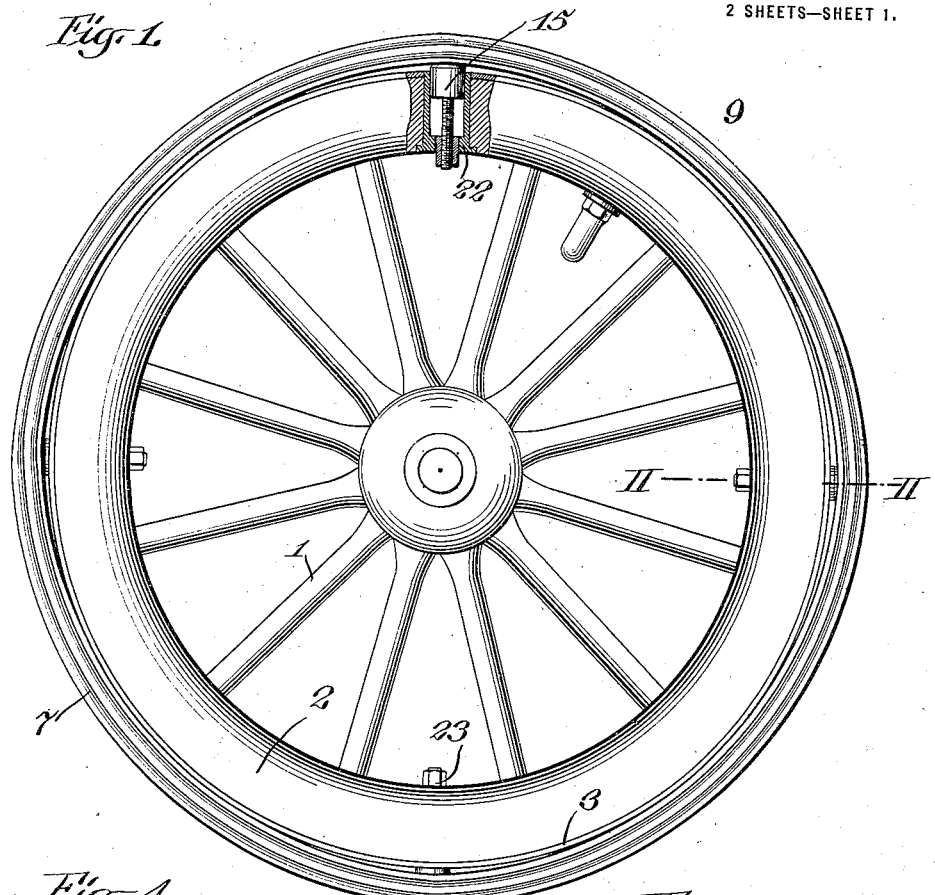
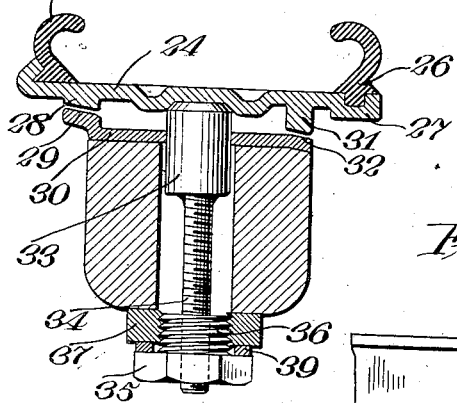
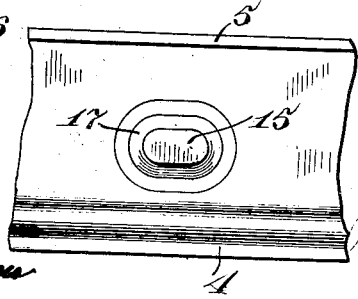
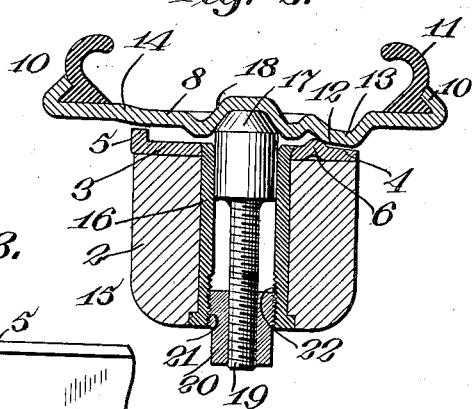
WITNESSES
Gerald E. Terwilliger
Edmund Quincy Moses
INVENTOR
James H. Wagenhorst
BY
Seward Davis
ATTORNEY

J. H. WAGENHORST.
VEHICLE WHEEL RIM.
APPLICATION FILED JAN. 22, 1912.

1,177,459.

Patented Mar. 28, 1916.
2 SHEETS—SHEET 2.

WITNESSES
Gerald E. Terwilliger
Edmund Quincy Moses

INVENTOR
James H. Wagenhorst
BY
Seward Davis
ATTORNEY

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,459.  Specification of Letters Patent.  Patented Mar. 28, 1916.

Application filed January 22, 1912. Serial No. 672,544.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of the class designed to carry pneumatic or other resilient tires, and particularly to improvements in demountable rims. In rim structures of this character the tire-carrying portion of the rim is made detachable from the wheel so that tire-carrying portions provided with pneumatic or other resilient tires may be interchangeably mounted upon a wheel, thus permitting a damaged tire to be replaced by a perfect one without the necessity of removing the tire from the tire-carrying rim and replacing it with another. In the case of pneumatic tires a tire-carrying rim having an already inflated tire thereon may be placed upon the wheel, thus avoiding the necessity for inflating the tire while on the road.

According to my present invention, I provide a tire-carrying rim fitting the felly member of a wheel sufficiently loosely to permit the rim to be readily applied to or removed from such felly member. In order to lock the rim upon the felly member, I provide means for forcing the rim radially outward at intervals, resulting in the drawing down of the rim between the points where it is forced out into close contact with the periphery of the felly member, or I may provide means for positively drawing the rim down into contact with the same.

The nature of my invention will more fully appear from the following detailed description.

Figure 6:
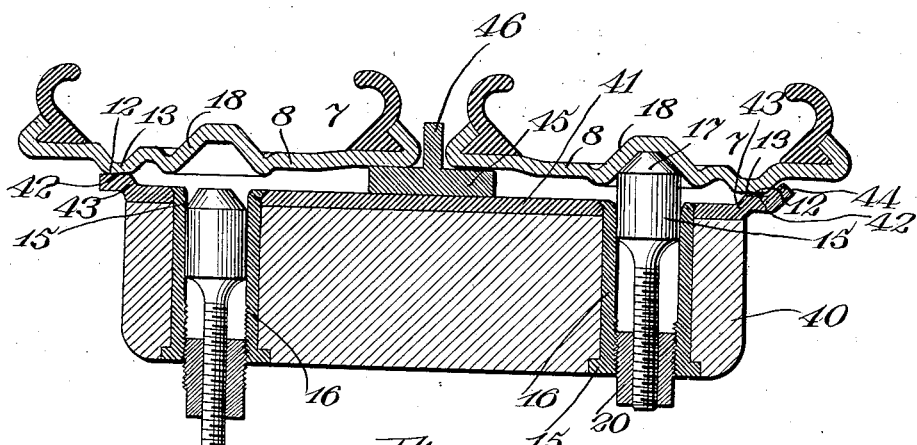
Figures 7, 8:
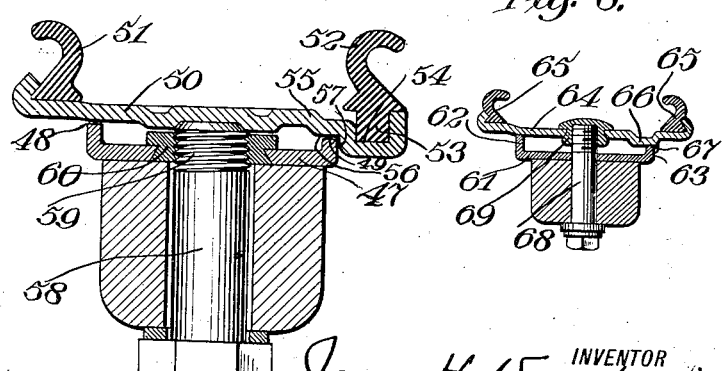

In the accompanying drawings which form a part of this specification, Figure 1 is a side elevation of a wheel having one embodiment of my improved rim applied thereto, a portion of the wheel felly being broken away to show the construction of one of the radial locking bolts; Fig. 2 is a section on line II—II of Fig. 1; Fig. 3 is a plan view of a portion of the felly band mounted upon the wheel felly and showing the end of one of the locking bolts of the form shown in Figs. 1 and 2; Fig. 4 is a view similar to Fig. 2 of a modified construction; Fig. 5 is a side elevation of a portion of a wheel felly and rim of the form shown in Fig. 4; Fig. 6 is a transverse section through a wheel felly provided with a dual rim construction; Fig. 7 is a view similar to Figs. 2 and 4 of another modification of my invention; Fig. 8 is a similar view of another form of my invention.

Referring to the drawings in detail, and particularly to Figs. 1, 2 and 3, the numeral 1 designates a vehicle wheel having a felly 2 upon which is permanently secured, by shrinking or otherwise, a felly band 3. The felly band 3 is provided at or near its edges with seats for the tire-carrying rim, one of these seats preferably being higher, that is, of greater diameter, than the other. As shown in Figs. 2 and 3, the felly band is provided at one edge with a low and preferably slightly beveled seat 4, and at the other edge with a higher seat 5, preferably formed by turning up a flange at the edge of the felly band 3. A ridge or rib 6 may be formed in the felly band adjacent to the seat 4 in order to provide a stop to limit the movement of the tire-carrying rim when the same is being applied to the wheel, as will be hereinafter set forth. By forming the seat 5 on a flange turned up from the edge of the felly band and by pressing out the rib 6 without thickening the metal of the felly band, the entire felly band may be cold-rolled from a strip of flat sheet metal, thus eliminating the necessity for special rolling mill rolls, such as would be required if hot-rolled stock of irregular cross section were needed. The metal of the felly band may be thinned enough to provide the slight bevel of the seat 4 by cold-rolling. The tire-carrying rim 7 may be of any suitable construction, for example, it may be a ring of metal having upturned tire-retaining flanges integral therewith, or as shown in Figs. 1 and 2, it may comprise a rim base 8 transversely split at the point 9, the rim base having inwardly turned side flanges 10 which engage the endless reversible tire-retaining flanges 11. The tire-retaining flanges 11 prevent the expansion of the rim base, and when they are forced outward, as when carrying an inflated tire, their toes engage beneath the inturned flanges 10 and prevent the collapse of the rim base. This construction of the rim base and flanges is fully described and claimed in my application Serial Number 639,953, filed July 22, 1911. The rim base is provided with a seat 12 adapted to engage the seat 4 on the felly band, this seat 12 being preferably formed by bending or cold-rolling a rib 13 in the rim base. The side of this rib 13 engages the rib 6 on the felly band and limits the lateral movement of the tire-carrying rim. At the other side of the felly band the bottom of the lower surface of the rim base rests directly upon the seat 5. A slight offset is preferably made in the rim base at this point, as indicated at 14, in order that the rim base may clear the seat 5 as soon as it is moved laterally a little way. This same lateral movement of the rim base also causes the rib 13 to clear the edge of the rim base and the rim is then free to be lifted from the wheel and the clearance between the rim base and the felly band is sufficient to permit the rim to be tilted, so as to draw the valve-stem of the tire from the hole through the felly through which it normally passes. This result is accomplished, it will be seen, by making the seat at one side of the felly band higher than the seat at the other side, so that as soon as the ridge on the rim base which engages the lower seat on the felly band is moved so as to clear the felly band, the rest of the rim base, being of greater diameter, will clear the felly band by a large margin.

In order to clamp the rim upon the wheel, I provide means for forcing the rim radially outward at intervals, so as to draw the intermediate portions of the rim into gripping engagement with the felly band. This arrangement is clearly illustrated in Fig. 1, in which the rim is shown forced outwardly at four points, the portions of the rim between the forced out points being drawn firmly down upon the felly band. I have found that a slight irregularity in outline of the rim when in use has little or no effect upon the operation of the wheel, as it is fully compensated for by the resilient tire upon the rim. I therefore prefer to make the wheel periphery circular and make the rim normally circular in outline. The rim is made just sufficiently larger in diameter than the felly band to give the necessary clearance to permit the rim to be applied to the felly, the necessary clearance being very slight where the felly band is provided with the seats of different elevations, as described. The rim is then clamped upon the felly band by being forced out at intervals into a slightly non-circular configuration, as shown in Fig. 1. Any suitable means for forcing the rim into its non-circular shape may be used. I have shown in the present case certain preferred means for forcing out portions of the rim.

As shown in Figs. 1, 2 and 3, the wheel felly carries a plurality of radial bolts 15 which are preferably of an approximately elliptical section, the longer axis of the section being disposed circumferentially of the wheel. These bolts slide in similarly shaped bushings 16 passing through the felly and preferably riveted to the felly band 3. Owing to the elliptical shape of the bolts, they are held against rotation in bushings, and the elongated section of the bolts gives a greater bearing surface for the ends thereof against the rim base. The ends of the bolts are preferably beveled or cone-shaped, as indicated at 17, these ends being received in similarly shaped sockets 18 pressed in the rim base. These sockets are preferably formed in the rim base without thickening the metal thereof, so that the rim base may be shaped entirely by cold-pressing, no hot-rolling or upsetting of the rim base being required. The rim accordingly is preferably of uniform thickness throughout. It is thus possible to construct the rim base out of flat sheet metal, and the utmost economy of manufacture is thus secured. The bolts 15 slide freely in the bushings 16 in a radial direction, but cannot turn therein. In order to move them radially, they are provided with threaded stems 19 which screw through nuts 20, the nuts 20 being externally threaded at 21 and screwing into threaded sockets 22 formed at the inner or lower ends of the bushings. The internal threads on the nuts which engage the threaded stems 19 are of opposite pitch from the external threads on the nuts which engage the threads of the sockets 22, so that upon the rotation of the nuts the latter will move into or out of the sockets 22 and at the same time the stems 19 will move out of or into the internally threaded openings through the nuts. Thus the bolts will have a radial movement equal to the combined movement of the stems of the bolts through the nuts and of the nuts through the sockets 22. The projecting portions of the nuts are faceted, as indicated at 23, so as to permit the same to be engaged by a wrench or the like. To lock the rim upon the wheel felly, it will be seen that it is simply necessary to turn the nuts 20 in a direction to screw them into the sockets 22, which will force the bolts 15 radially outward and cause the ends of the bolts to enter the sockets 18. Owing to the cone-shape of the ends of the bolts and of the sockets, the bolts will serve to center the rim accurately upon the wheel. The further forcing out of the bolts will lift the rim away from the seats on the felly band slightly, as indicated in Figs. 1 and 2, thus causing the intermediate portions of the rim to be drawn tightly down upon the seats on the felly band, as shown in Fig. 1. The rim will thus grip the felly band and firmly clamp itself thereupon. The ends of the bolts entering the sockets 18 also serve to positively prevent lateral and circumferential movement of the rim upon the felly. Driving lugs such as are usually used for preventing circumferential movement of demountable rims are thus unnecessary. In order to detach the rim from the wheel, the bolts 15 are withdrawn into the bushings until their ends clear the sockets 18. This will release the pressure which holds the rim in its non-circular outline and will permit the rim to resume its initial circular shape. The rim will thus free itself from its gripping engagement with its seats upon the felly band and may be moved laterally. As soon as it has been moved laterally through a very short distance, for example, perhaps a quarter of an inch, it clears the seats on the felly band, as above explained, and may be readily removed from the wheel.

In Figs. 4 and 5 I have shown a modification of my invention in which the tire-carrying rim comprises an endless rim base 24 carrying one endless tire-retaining flange 25 and one transversely split tire-retaining flange 26, a portion of which seats within a channel 27 formed at one edge of the rim base. In order to permit the endless flange 25 to be removed and reversed, it will be seen that no portion of the rim base must be of greater diameter than the minimum diameter of said flange, and the sockets for receiving the ends of the radial bolts are therefore depressed below the surface of the rim base, the tops of the sockets being flush with the surface of the rim base, as shown. The rim base is provided with a low rib 28 adapted to seat upon a high bearing surface 29 formed at one edge of the felly band 30, and with a high rib 31 adapted to engage a low slightly beveled bearing surface 32 formed at the opposite edge of the felly band. The means for forcing the rim radially outward at intervals comprise a suitable number of bolts 33 similar to the bolts 15 shown in Figs. 1, 2 and 3, these bolts being provided with stems 34 screwing through holes in nuts 35. In order to avoid the necessity of using bushings passing through the felly, the nuts 35 have externally threaded necks 36 which screw through the plates 37 secured to the under-surface of the felly. These plates are preferably held in place by means of rivets 38 which pass through the felly and are riveted to the felly band, so that the pressure on the ends of the bolts 33 is transmitted through the nuts 35, plates 37 and rivets 38 to the felly band, which seats firmly upon the periphery of the felly. A suitable locking washer 39 may be used to prevent accidental rotation of the nut 35, if desired. The operation of the rim shown in Figs. 4 and 5 is practically the same as that shown in Figs. 1, 2 and 3, and a further detailed description thereof is believed to be unnecessary.

In Fig. 6 I have shown a form of my invention as applied to a dual rim construction. In the use of resilient tires, particularly pneumatic tires, upon very heavy vehicles such as motor trucks, it has often been found necessary to provide each wheel with a pair of tires arranged side by side. Such tires are known as dual or twin tires. As will be obvious, each tire must be carried on its own tire-carrying rim. As shown in Fig. 6, 40 is the wheel felly, upon the periphery of which is permanently mounted the felly band 41. This felly band is provided at each edge with a seat 42 preferably formed upon a raised flange 43. These seats 42 correspond in function to the seat 4 shown in Fig. 2. The seat 42 at the inner edge of the wheel felly is preferably provided with a flange or stop 44 to limit the movement of the tire-carrying rim supported on the seat 42. Two tire-carrying rims are used, these rims preferably being of the construction shown in Figs. 1 and 2 and already fully described, although they may be of any other suitable construction and are not necessarily identical. When rims of the construction shown are used, they are placed upon the felly in opposite positions, the first rim being applied to the felly with the rib 13 toward the inside of the wheel, where the seat 12 will engage the seat 42. The flange 44 will engage the side of the rib 13 and limit the lateral movement of the rim. The use of a flange 44 or other stop is not necessary, but facilitates the application of the rim. The inside rim having been applied, a transversely split ring 45 is sprung over the outer flange 43 and seated upon the felly band. It is then pushed under the rim base 8 of the first rim 7 and forms a seat for one side of the latter. The ring 45 is preferably provided with an outwardly extending flange 46 by which it may be pried off. This ring 45 having been applied, as described, the second tire-carrying rim 7 is then placed in position, its inner edge resting upon the ring 45 and the seat 12 on the rib 13 engaging the seat 42 at the outer side of the wheel. The two tire-carrying rims are clamped upon the wheel exactly as the tire-carrying rim shown in Figs. 1 and 2 is clamped upon its wheel. Radial bolts 15 of the construction already described are preferably used for this purpose, these bolts passing through bushings 16 and being operated by nuts 20. The conical ends of the bolts 17 are received in the sockets 18 of the rim bases 8.

It will be seen that by forming the seats 42 for the rims upon the raised flanges 43 at the edges of the felly band, the inside tire-carrying rim may be very readily removed, as after the outside rim and the ring 45 have been taken off the felly, a slight lateral movement of the inside rim will cause the rib 13 to clear the raised seat 42, which will leave the rim very loose upon the felly. The rim may then be tilted sufficiently to remove the valve-stem from its socket through the felly, when the rim is free to be removed laterally.

In Fig. 7 I have shown a modification of my invention in which the felly band 47 is provided at each edge with an upturned flange. One of these flanges is higher than the other, its edge forming a seat 48, the edge of the lower flange forming a seat 49. The tire-carrying rim shown in this figure comprises an endless rim base 50 having one endless tire-retaining flange 51 and one transversely split tire-retaining flange 52. The flange 52 is mounted upon a base 53 which is received within a channel 54 formed at the edge of the rim base. The ends of the flange 52 may be secured together and the flange be retained in the channel in any suitable manner, as by means of the locking device shown in the patent to Bryant, No. 912,537, dated February 16, 1909. Adjacent to the channel 54 the rim base has formed in it an offset 55, the lower surface of which forms a seat 56 adapted to rest upon the seat 49, while the side of the channel 54 forms a shoulder 57 which abuts against the side of the felly band and limits the lateral movement of the rim. In order to clamp the rim upon the felly band, a plurality of bolts 58 are used, these bolts having threaded portions 59 which screw through blocks 60 riveted in holes formed in the felly band, as shown.

Fig. 8 illustrates a modification of my invention in which the tire-carrying rim is secured upon the felly band by being drawn down upon the same at intervals instead of being forced away from the felly band, as in the form of my invention shown in Fig. 1. In this figure 61 is the felly band having the upturned flanges 62 and 63 formed at the edges thereof, the edges of these flanges forming seats for the tire-carrying rim. 64 is the tire-carrying rim which is transversely split and provided with endless tire-retaining flanges 65. The tire-carrying rim has rolled in it a rib 66, the lower surface of which forms a seat which engages the lower flange 63. The rib 66 is preferably provided with a series of inwardly extending projections 67 which engage the side of the flange 63 and locate the rim upon the felly band. The rim is drawn down upon the seat on the felly band by means of a plurality of bolts 68, the upper ends of which are screw-threaded and screw into threaded sockets formed in bosses 69 carried by the rim. These bosses 69 preferably comprise blocks of metal inserted through holes in the rim base and riveted therein, this being preferable to forming the bosses integral with the rim base for the reason that they can be replaced if the threads are stripped from the sockets therein. The bolts 68 draw the rim base into close contact with the seats on the felly band throughout the greater part of the circumference of the wheel. They also prevent lateral and circumferential movement of the rim upon the felly band. It is obvious that this means of locking a rim on a wheel may be utilized with endless tire-carrying rims as well as with transversely split tire-carrying rims.

While I have shown in the drawings and described in detail certain preferred embodiments of my invention, I do not desire to be limited to these specific forms of my invention, as they are merely illustrative thereof. I intend to cover my invention and the novel principle thereof broadly, and do not desire to limit myself to the specific details.

Having thus described my invention, I claim:

1. In a vehicle wheel, in combination, a felly member having a seat for a rim near each side thereof, one of said seats being of greater diameter than the other, a rim having seats of different diameters adapted to engage the seats on said member, and means for changing the configuration of said rim without decreasing its peripheral length to cause it to clamp the seats on said member.

2. In a vehicle wheel, in combination, a felly member having a seat for a rim near each side thereof, one of said seats being of greater diameter than the other, a rim having seats of different diameters adapted to engage the seats on said member, and means for forcing said rim away from said member at separated points to cause the said rim to clamp the seats on said member between said points.

3. In a vehicle wheel, in combination, a felly, a felly band thereon having seats of different diameters formed at the sides thereof, a removable tire-carrying rim adapted to be mounted on said felly band, said rim having seats of different diameters adapted to engage the seats on said felly band, and radially disposed bolts carried by said felly and spaced at intervals about its circumference said bolts acting to force portions of said rim away from said felly to cause the intermediate portions of said rim to clamp the seats on the felly band.

4. In a vehicle wheel, in combination, a felly, a felly band thereon having seats of different diameters formed at the sides thereof, a removable tire-carrying rim adapted to be mounted on said felly band, said rim having seats of different diameters adapted to engage the seats on said felly band, and radially disposed bolts carried by said felly and spaced at intervals about its circumference said bolts acting to force portions of said rim away from said felly to cause the intermediate portions of said rim to clamp the seats on the felly band, said bolts having conical ends fitting conical sockets formed in the rim.

5. In a vehicle wheel, in combination, a felly, a felly band thereon having an upturned flange at one edge thereof, the periphery of which forms a seat for supporting one side of a tire-carrying rim, and having at the other edge thereof a seat of less diameter than the seat formed on said flange for supporting the other side of a tire-carrying rim, a rib formed in said felly band adjacent to said second seat, a tire-carrying rim adapted to be mounted upon said wheel and having seats of different diameters adapted to engage the seats on said felly band, and means for forcing said rim away from said felly band at intervals to cause the intermediate portions of said rim to clamp the seats on said felly band.

6. In a vehicle wheel, in combination, a fixed wheel member, a detachable tire-carrying rim adapted to be mounted on said member, and means for securing said rim upon said member including radially disposed threaded bolts carried by said member, said bolts being slidably mounted in openings through the said member but being held against rotation in said openings, and means for operating said bolts comprising nuts screwing on said threaded extensions on said bolts, said nuts being externally threaded and screwing into internally threaded members carried by said member.

7. In a vehicle wheel, in combination, a fixed wheel member, a detachable tire-carrying rim adapted to be mounted upon said member, and means for securing said rim to said member including radial bolts carried by said rim, said bolts having a flattened section, the major axis of which is circumferentially disposed with relation to the member, said bolts sliding in bushings passing through the member and having threaded stems extending from the inner ends thereof, and nuts screwing on said stems, said nuts being externally threaded and screwing into threaded portions of said bushings, the pitch of the threads on the outsides of said nuts and on said bushings being opposite from the pitch of the threads on said stems and the insides of said nuts.

JAMES H. WAGENHORST.

Witnesses:
OLIVER WILLIAMS,
W. D. HOLT.